United States Patent
Prandi (10) Patent No.: US 11,109,566 B2
(45) Date of Patent: Sep. 7, 2021

(54) SYSTEM FOR THE CONTROLLED DISTRIBUTION OF FOOD FOR FEEDING ANIMALS

(71) Applicant: Santiago Miguel Prandi, Córdoba (AR)

(72) Inventor: Santiago Miguel Prandi, Córdoba (AR)

(*) Notice: Subject to any disclaimer, the term of this patent is extended or adjusted under 35 U.S.C. 154(b) by 357 days.

(21) Appl. No.: 16/376,730

(22) Filed: Apr. 5, 2019

(65) Prior Publication Data

US 2020/0315134 A1 Oct. 8, 2020

(51) Int. Cl.
*A01K 5/00* (2006.01)
*A01K 5/02* (2006.01)

(52) U.S. Cl.
CPC ............ *A01K 5/001* (2013.01); *A01K 5/0208* (2013.01); *A01K 5/0266* (2013.01); *A01K 5/0275* (2013.01)

(58) Field of Classification Search
CPC .............................. A01K 5/001; A01K 5/0208
See application file for complete search history.

(56) References Cited

U.S. PATENT DOCUMENTS

| | | | | |
|---|---|---|---|---|
| 3,111,114 | A | * 11/1963 | Bayerl | A01K 5/0208 119/57.1 |
| 3,256,863 | A | * 6/1966 | Patz | A01K 5/0208 119/57.5 |
| 3,261,324 | A | 7/1966 | Conover | |
| 4,254,736 | A | 3/1981 | Bohr | |
| 6,062,165 | A | 5/2000 | Sieling | |
| 9,743,596 | B1 | 8/2017 | Prandi | |
| 2019/0230899 | A1 | 8/2019 | Greive et al. | |

FOREIGN PATENT DOCUMENTS

GB 2056837 A 3/1981

OTHER PUBLICATIONS

International Search Report and Written Opinion received for PCT/IB2020/053134 dated Jul. 2, 2020.

* cited by examiner

*Primary Examiner* — Jessica B Wong
(74) *Attorney, Agent, or Firm* — Greer, Burns & Crain, Ltd.

(57) ABSTRACT

A system for the controlled distribution of food for feeding animals, which includes a plurality of concentric circular sections with feeders for animals, a self-propelled central pivot machine arranged in a center of concentric circular sections, the self-propelled machine having a pivot base and a main head; a first pivoting span connected to the pivot base and at the proximal end of which the main head is arranged, while at the distal end a food discharge head is arranged; a main pipe that moves food to the main head and from the latter to the food discharge head and to the respective feeders arranged in the circular concentric sections.

15 Claims, 13 Drawing Sheets

SYSTEM FOR THE CONTROLLED DISTRIBUTION OF FOOD FOR FEEDING ANIMALS

BACKGROUND

Field of the Invention

The present invention relates to the field of devices, means and arrangements used for feeding animals, preferably in cattle feed pens, dairy farms and more particularly the invention relates to a system for the controlled distribution of food for feeding animals that makes it possible, by means of a self-propelled central pivot machine, to distribute simultaneously and in a controlled manner the food in a larger number of feeders during its path, that is, along the length of the machine a much greater path length for the discharge in many more feeders is achieved. At the same time, it makes it possible to collect information of the animals to be fed along a surface comprised by the path of a feeding means in order to provide a controlled and selective amount of food for each animal and/or feeder.

Even though reference is made in the present description to a food distribution system for feeding animals, it should be clear that this does not imply that the invention is limited thereto, but the system of the invention can be considered, adapted and used for the distribution of various types of products, being granular, solid, powdered and/or liquid, either independently or jointly with other similar distribution means without any inconvenience.

Description of the Prior Art

Mixing carts or "mixers" are normally used to mix a series of selected ingredients in a homogeneous way and in controlled quantities to provide a balanced diet that provides the necessary nutrients for the animals. Generally, mixers usually comprise a hopper inside which one or more mixing cylinders are housed that receive and mix the material or ingredients for the portion of food. A discharge gate is provided on one of the sides of the hopper and is driven by a cylinder that allows the opening and closing thereof. Likewise, said discharge gate is accompanied by a discharge tray and at least one discharge conveyor, which together allow the discharge of the mixed food to the respective feeders. In turn, the hopper is pulled through a lance and the mixing cylinders are driven through a driving universal joint which shall be connected to a respective motor. Mixers are operated by an operator trained for this purpose, which is essential to achieve an almost homogeneous distribution of food portions, being "almost homogeneous" as in practice, there are many drawbacks in distribution that hinder complete homogeneity. It is emphasized that mixers are well known in the field of the art and that for such reasons, no more descriptive details about them shall be included.

Based on the foregoing, the food distribution plan of the day is carried out based on the kilograms necessary for that feeder or pen. Thus, the mixer operator knows and distributes approximately the kilograms of food needed to be discharged.

It is of utmost importance that in each of these passes, at the beginning of the feeder the expected kilograms be delivered and distributed evenly and homogeneously along the feeders. That is, if a controller goes behind the mixer and takes the same length per width of the feeder in different points, it extracts the food, weights it and the weight of each control of the content in that length for the width of the feeder should be same or with very little variation. The operator is positioned at the beginning of the feeder, puts the discharge belt into operation, starts up the tractor, looks at the balance and presses the respective key to set it in the discharge mode, accelerating the tractor to take it to the recommended RPM, and while releasing the clutch, the operator shall open the food exit gate, drive the tractor and manage to deliver food in a homogeneous and perfect manner along the feeder. At the end she/he shall close the gate, stop and record the discharged kilograms and so on pen by pen. As you can see, it takes a lot of practice and years of experience to do all the tasks at the same time and in the right way.

However, nowadays it happens that if the mixer operator has many years of experience, he/she still delivers an approximate amount of food required by each feeder, therefore he/she should always regulate the discharge for the next passes. Otherwise, if the mixer operator does not have enough experience, it is very likely that he leaves areas of feeders with little food and others with plenty or excess food. The cattle have a social behavior where the dominant ones eat first. If an animal is assigned an area with lot of food, it shall eat until it is satiated, but there shall be food left. Then, the mixer passes again and the food continues in abundance, with the effect of the saliva of the animals, the rain or humidity of the food itself.

Under these conditions, it happens that the food decomposes and when it decomposes it generates an odor changing its flavor. If it is not removed manually, the food rots and the animals that would have to eat in that area do not eat until someone cleans the feeder. Once clean, the animals come to the feeder and eat excessively, which can generate imbalances in the diet.

In the same way, it happens if a space of the feeder is left without food. When the animal goes to its place in the feeder and does not see food, it moves away or competes for space with another animal. Although acidosis does not cause death, it generates alterations in the conversion of kilograms necessary to obtain a kilogram of meat and at economic level it means great losses. In addition to the above, the mixer operator becomes an essential element for fattening animals, more particularly if the mixer operator has vast experience. But in turn, the mixer operator should have days off and sick or justified leaves, so his/her replacement is always someone not so well versed in the handling of the mixer, this being undesirable as it results in the aforementioned drawbacks.

As you can see, the mixer operator is a fundamental piece for the distribution of food in pens. Without him/her, the distribution tasks can be adversely affected and, consequently, affect health of animals. Likewise, the mixer operator has to distribute food in each feeder as he/she passes through them. That is, he/she does not have the capacity to distribute simultaneously to all feeders, so that a flaw in the mixing machine could cause several animals to remain without eating with the subsequent drawback mentioned above. In turn, by not simultaneously distributing the food a significant time gap is generated between the first feeder and the last one. This implies that animals of the last feeders are not fed at the appropriate times. In addition, if the pen is large, operation times for the discharge and distribution of food can be long, leading to premature physical wear of the mixer operator. And as described above, not having a mixer operator with sufficient experience can result in a series of harmful disadvantages.

By virtue of the current state of the art available for dosing food for feeding cattle, it would be very convenient to have a new arrangement that is constituted and constructed to allow a controlled distribution or dosage of food and/or feed for each animal and/or feeder throughout each lot and/or dairy farms in order to avoid the above-mentioned inconveniences, allowing, in turn, a simultaneous distribution in a larger number of feeders and/or dairy farms and being partially independent of the skills of the mixer operator.

SUMMARY

It is therefore an object of the present invention to provide a new system for the controlled distribution of food for feeding animals, dairy farms, which is capable of being installed in a self-propelled central pivot machine as well as linear, corner machines.

It is still another object of the present invention to provide a distribution system that allows the food to be distributed simultaneously and controlled in a larger number of feeders only with the length of the self-propelled machine.

It is another object of the present invention to provide a system provided with a plurality of sensors that collect information of targets to be fed, in order to determine the exact amount of food to be discharged.

It is therefore an object of the present invention to provide an automated system for distributing feed to feeders for fattening livestock thanks to a prescribed map containing the information collected from each feeder.

It is another object of the present invention to provide an arrangement for the controlled dosing of livestock feed that prevents acidosis in animals, among many other drawbacks.

It is still another object of the present invention to provide a system that has a circular-shaped feeding track in the center of which the self-propelled machine is arranged in conjunction with an external feeding means.

It is also another object of the present invention to provide a distribution system of any type of product, whether in solid, granular, powder, liquid form, or a combination thereof.

It is still another object of the present invention to provide a distribution system having main pipe through which food circulates from an external feeding means to respective discharge heads which are responsible for providing controlled feed in the feeders.

It is still another object of the present invention to provide control boxes that allow gathering information as well as regulating the speed of food discharge depending on the location, dairy farm, the feeder, and the animals that come to it.

It is still another object of the present invention to provide a distribution system that does not require a linear displacement, as well as, it does not require that external food transport vehicles go to the location where the machine is moving through the displacement tracks where feeders are located.

It is another object of the present invention to provide a controlled distribution system that avoids total dependence of the mixer operator to carry out the distribution, since the distribution is carried out in an automated way.

It is yet another object of the present invention to provide a distribution system that features a self-propelled central pivot machine that comprises infinity of linearly aligned spans, lengths or sections that allow a larger number of feeders to be simultaneously supplied, the number of spans being dependent on the structural limitations of the location.

It is also another object of the present invention to provide a distribution system in a circular form that allows feeding a greater number of animals with short length sections of the self-propelled machine.

It is still another object of the present invention to provide a system for the controlled distribution of food for feeding animals that comprises a plurality of circular concentric sections and separated at a distance from each other such that respective tracks of displacement are defined between them, said sections being interrupted in a middle portion by a passage projecting towards their center, a self-propelled central pivot machine arranged in said center and connected to an external feeding means, said self-propelled machine having at least one pivot base and at least one main head; at least a first pivoting span connected to said pivot base and at which proximal end said main head is arranged while at the distal end there is a discharge head; at least a main pipe that transports the food coming from the external feeding means to the main head and from the latter to the discharge head; wherein, said discharge head comprises means for discharging food coming from the main pipe to the respective feeders that surround the perimeter of the concentric circular sections, and at least one lower running gear that allows the transfer of the discharge head through the displacement tracks.

BRIEF DESCRIPTION OF THE DRAWINGS

For greater clarity and understanding of the object of the present invention, it has been illustrated in several figures, in which the invention has been depicted in one of the preferred embodiments, all by way of example, wherein.

DETAILED DESCRIPTION

Referring now to the figures, it is seen that the invention consists of a new system for the controlled distribution of food for feeding animals, which provides a controlled and selective distribution dependent on each animal and/or feeder and/or dairy farm by virtue of the fact that the system is composed of a plurality of distribution points that are installed consecutively one behind the other covering different displacement/distribution tracks that make it possible, only with the length of a machine, to achieve a theoretically infinite multiplicity of distribution tracks only limited by the spatial requirements of the target to be fed, as well as information gathering of the target to be fed is achieved, being the invention applicable to machines self-propelled by central pivot, frontal, lateral or corner advance, allowing at the same time, a better simultaneous distribution of food to a greater number of feeders.

Although, the present invention may have structural similarities with U.S. Pat. No. 9,743,596 belonging to the same owner, which is incorporated by way of reference in the present application, it is noted that the object of the present invention is focused on the distribution of food (or similar) for feeding livestock, such as in pens and dairy farms, and not for the distribution of a phytosanitary product along an extension field. Likewise, there are different elements that allow the distribution of the respective products, therefore, so are the inventive objects that each one covers.

Figure 15:
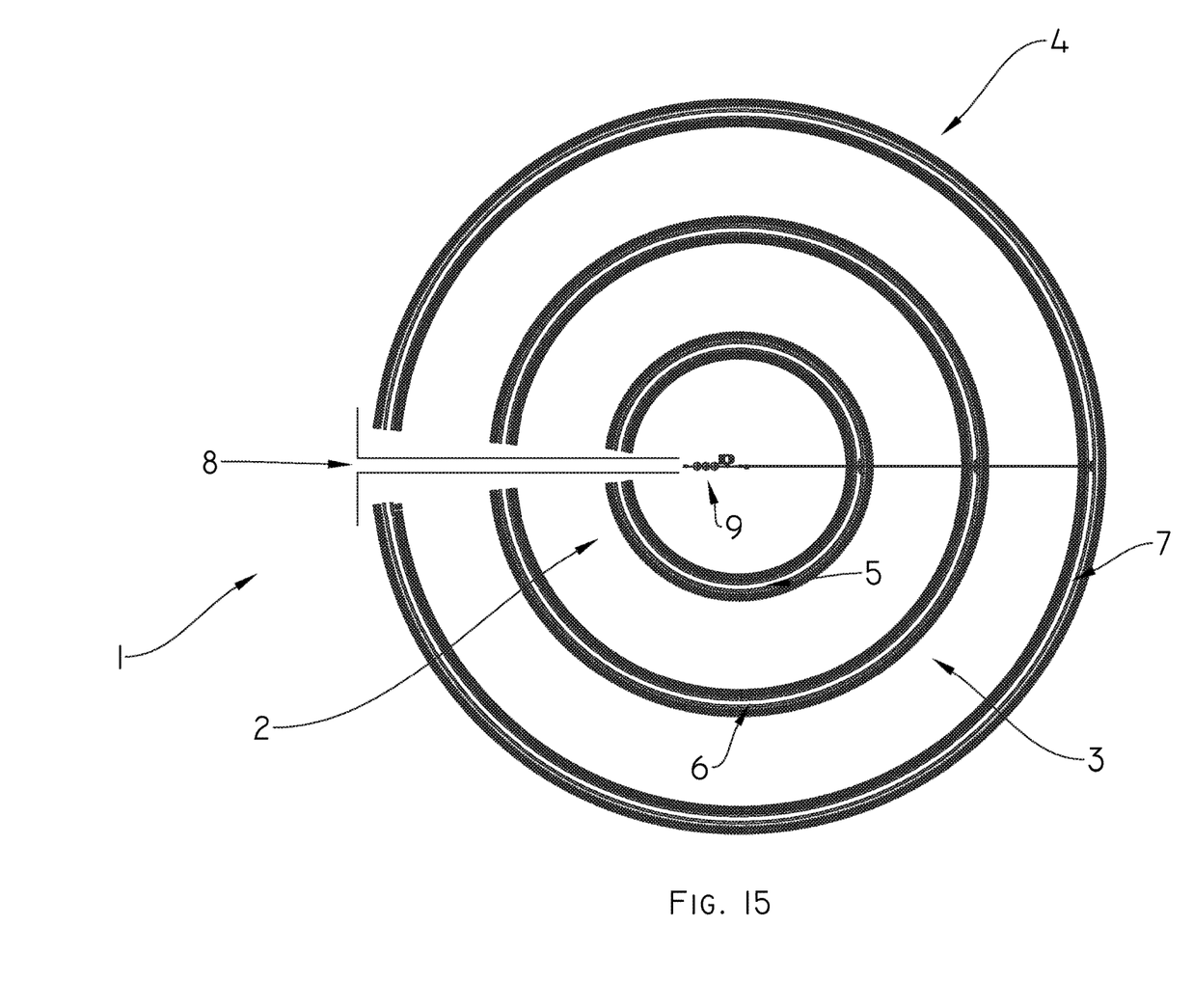
FIG. 15 shows a total top view of the system of the invention.

Thus, the system for the controlled distribution of food for feeding animals of the present invention firstly comprises a feeding track 1 as best illustrated in FIG. 15. Said feeding track 1 comprises at least a plurality of concentric circular sections 2, 3 and 4 and spaced apart from each other such that respective displacement tracks 5, 6 and 7 are respectively defined, as best illustrated in FIGS. 11 and 13 to 15, whose amount is not limiting for the invention since the number of displacement tracks as well as circular sections will depend on the structural limitations of each location. Likewise, said circular sections 2, 3 and 4 are interrupted in a middle portion by a passage 8 projecting towards the center thereof. Said passage 8 shall allow the passage of external food transport vehicles that shall discharge food in an external feeding means 9 arranged in the center of the sections.

In the prior art, food transport vehicles had to approach the mixer which could be placed in a passage or displacement track where the feeders are located. It is known that the passages or tracks of displacement are not always in good condition, being generally of soil, and the displacement of said trucks could affect even more the state of the same. This implies that if the road condition is not the best, the mixer truck may have problems to circulate and consequently, inconveniences to carry out the distribution of the food. On the contrary, by means of the present invention, the vehicles now circulate on a single path (passage 8) exclusively designed for them, without this being detrimental to the state of displacement tracks.

It should be noted that said circular concentric sections 2, 3 and 4 enclose an area within which the animals to be fed are, for example cows 10 in the case of the invention but not limiting to them. Circular sections are surrounded on their perimeter by respective feeders 11 that are sectioned in order to ensure that all animals can be fed according to the corresponding diet plan for each one.

Figure 1:
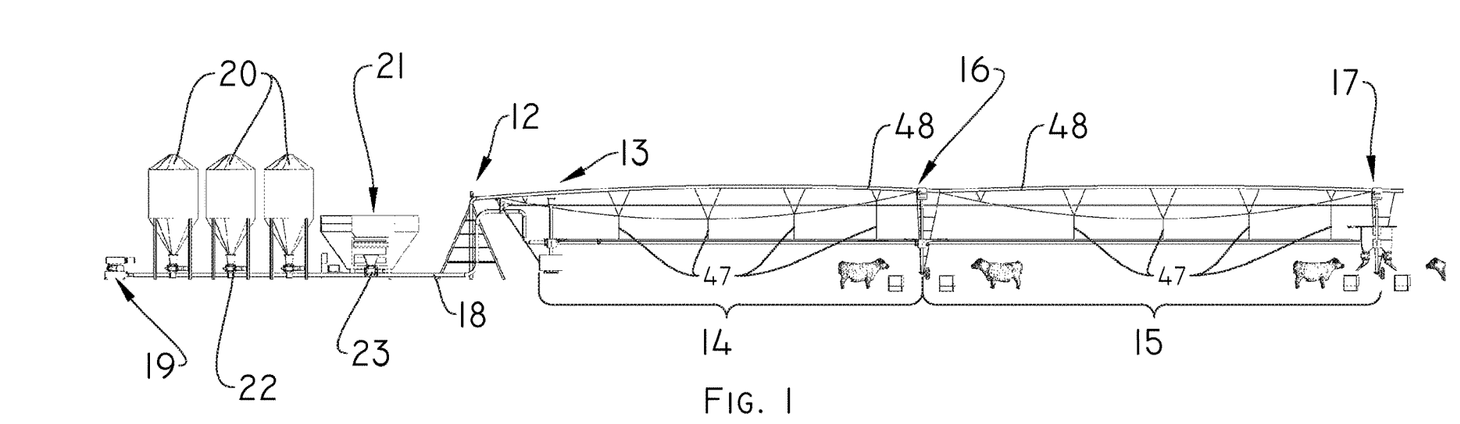
FIG. 1 shows a view of a self-propelled machine with a central pivot connected to an external feeding means, in which the system can be used according to the present invention.

On the other hand, in said center there is at least one self-propelled central pivot machine having at least one pivot tower or base 12, at least one main head 13, at least one first span 14 connected to said pivot base 12 and at which proximal end said main head 13 is arranged, at least a second span 15 linearly aligned with said first span 14, at least a first discharge head 16 arranged between said first 14 and second 15 span, and a second discharge head 17 at the final end of the second span 15, as best illustrated in FIG. 1. The self-propelled central pivot machine is connected to said external feeding means 8 through a main pipe 18 that transports the food coming from the external feeding means 8 to the main head 13 and from the latter to the discharge heads 16 and 17.

Figure 2:
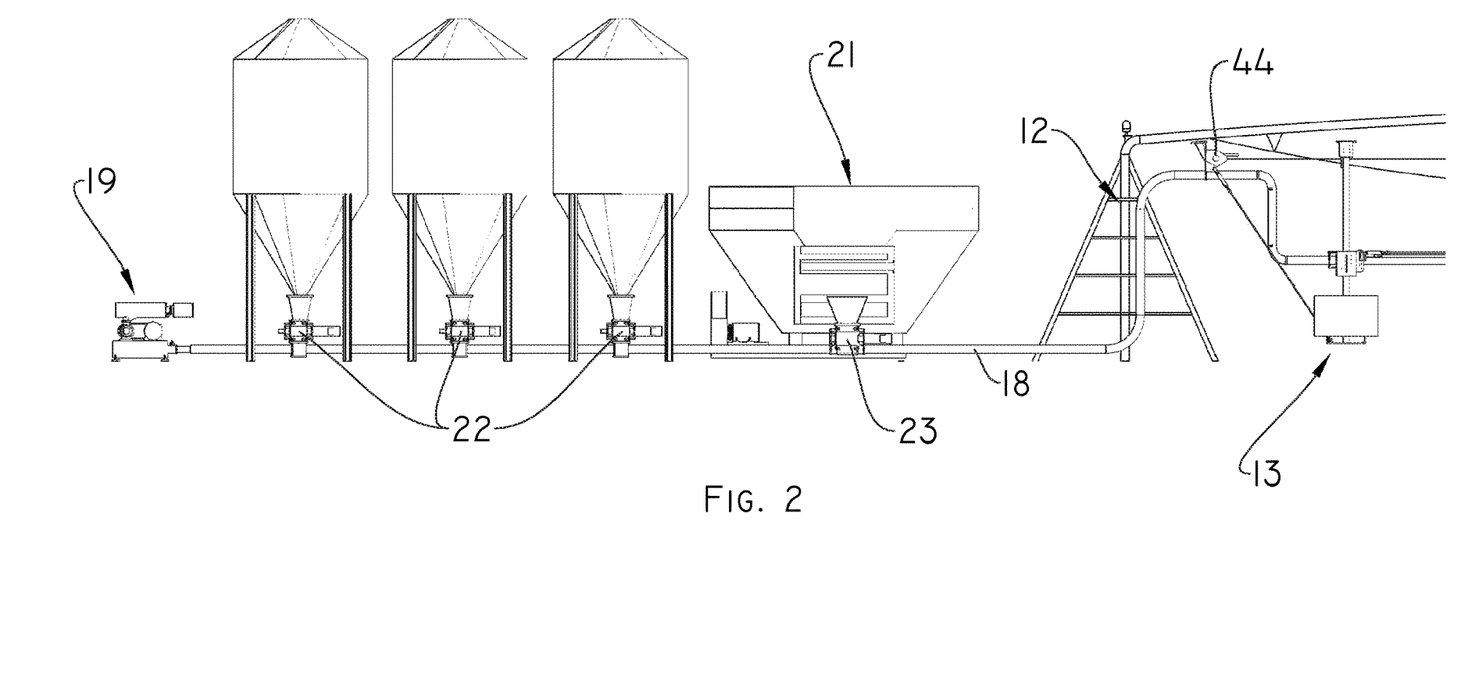
FIG. 2 shows a detailed view between the external feeding means and a proximal portion of the central pivot machine.
Figure 3:
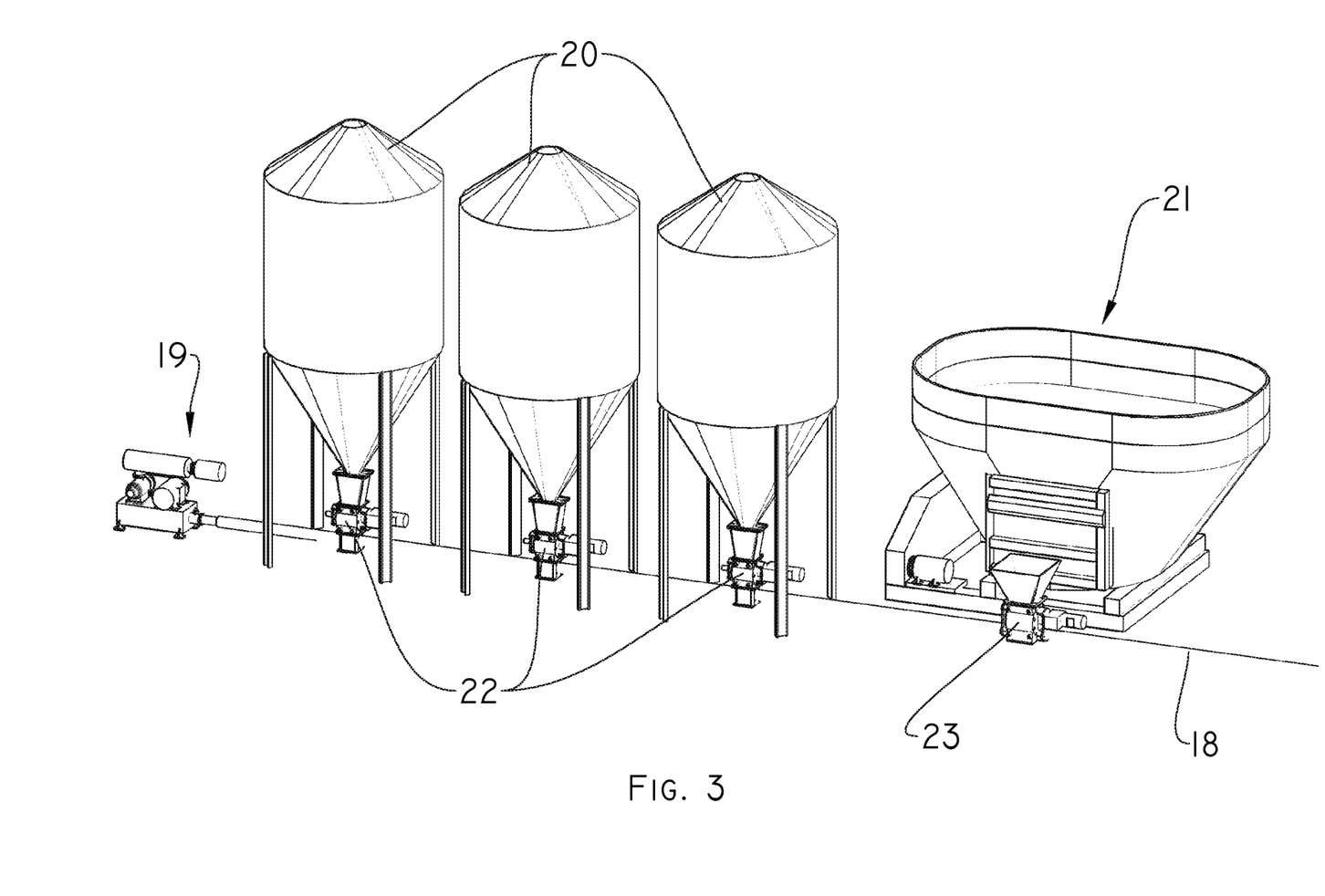
FIG. 3 shows a perspective and enlarged view of the external feeding means according to the present invention.
Figure 4:
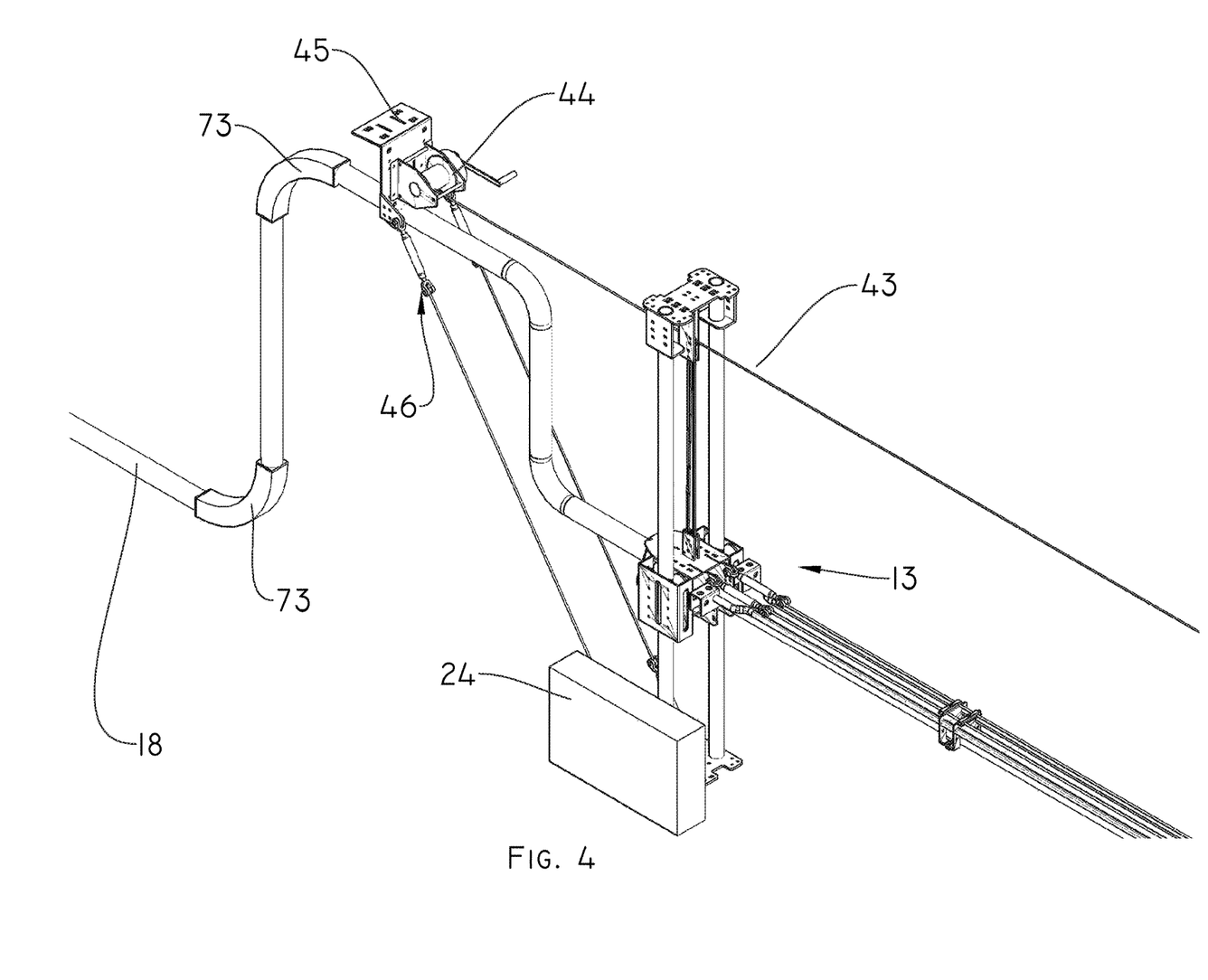
FIG. 4 shows a perspective and enlarged view of a portion of a first end of the self-propelled central pivot machine according to the present invention.

On its turn, said external feeding means 8 comprises at least an air blower 19 connected to said main pipe 18, a plurality of silos 20y at least a stationary mixer 21, said silos 20 and mixer 21 being connected to the main pipe 18 through respective rotary valves 22 and 23, as best illustrated in FIGS. 1 to 3. Although, in the present invention reference is made to an air blower 19 as external feeding means 8, this does not imply that the invention is limited thereto, but other types of transport or feeding means such as, for example, an auger and/or conveyor extending along and inside the main pipe 18, can also be considered and used. The air blower 19 is driven by a motor (not shown) which in turn is driven by a control panel 24 arranged in said main head 13.

Figures 5, 6:
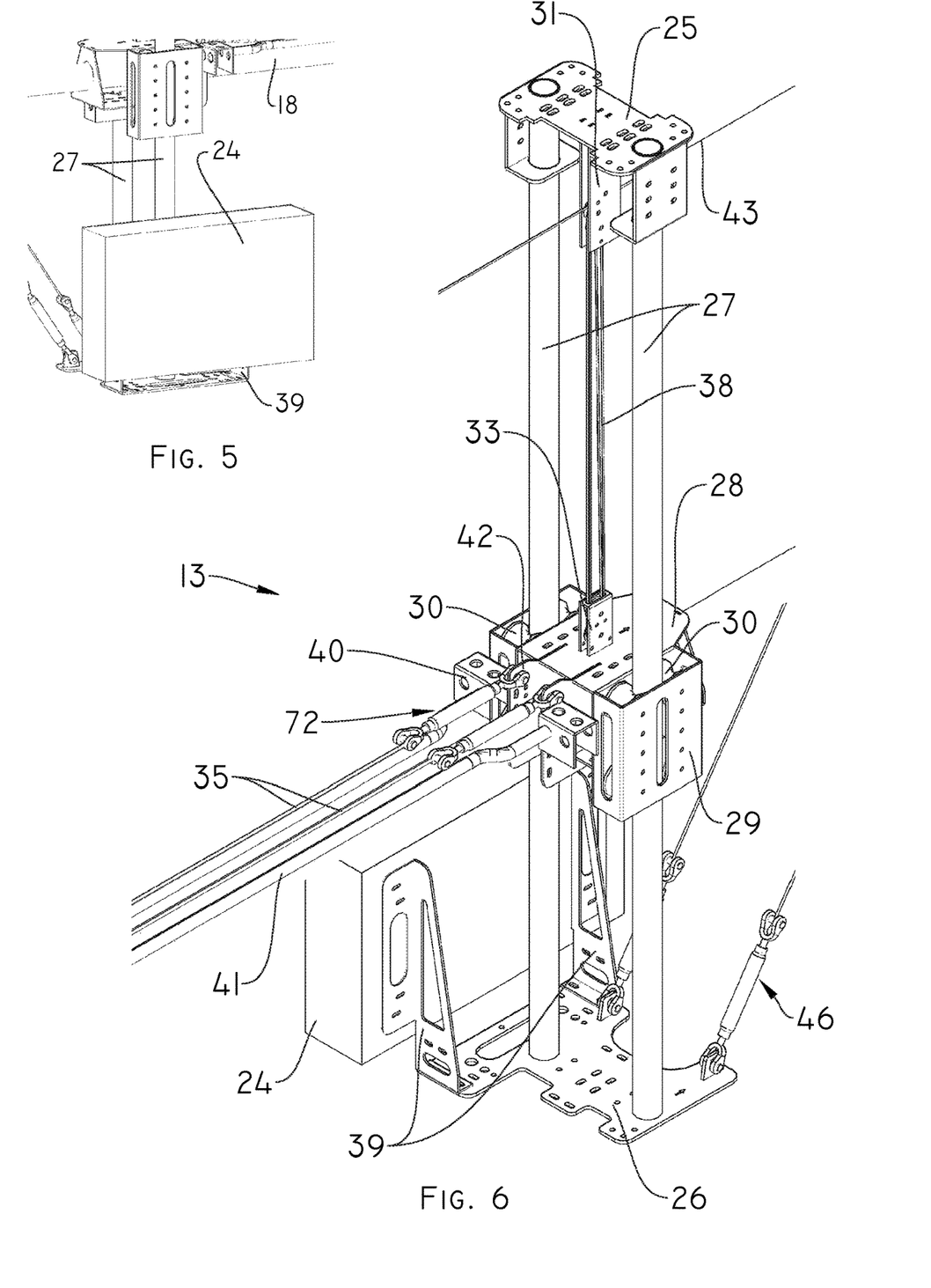
FIG. 5 shows a perspective and enlarged view of a control panel according to the present invention.
FIG. 6 shows a perspective and enlarged view of a main head according to the present invention.
Figures 7A, 7B, 7C:
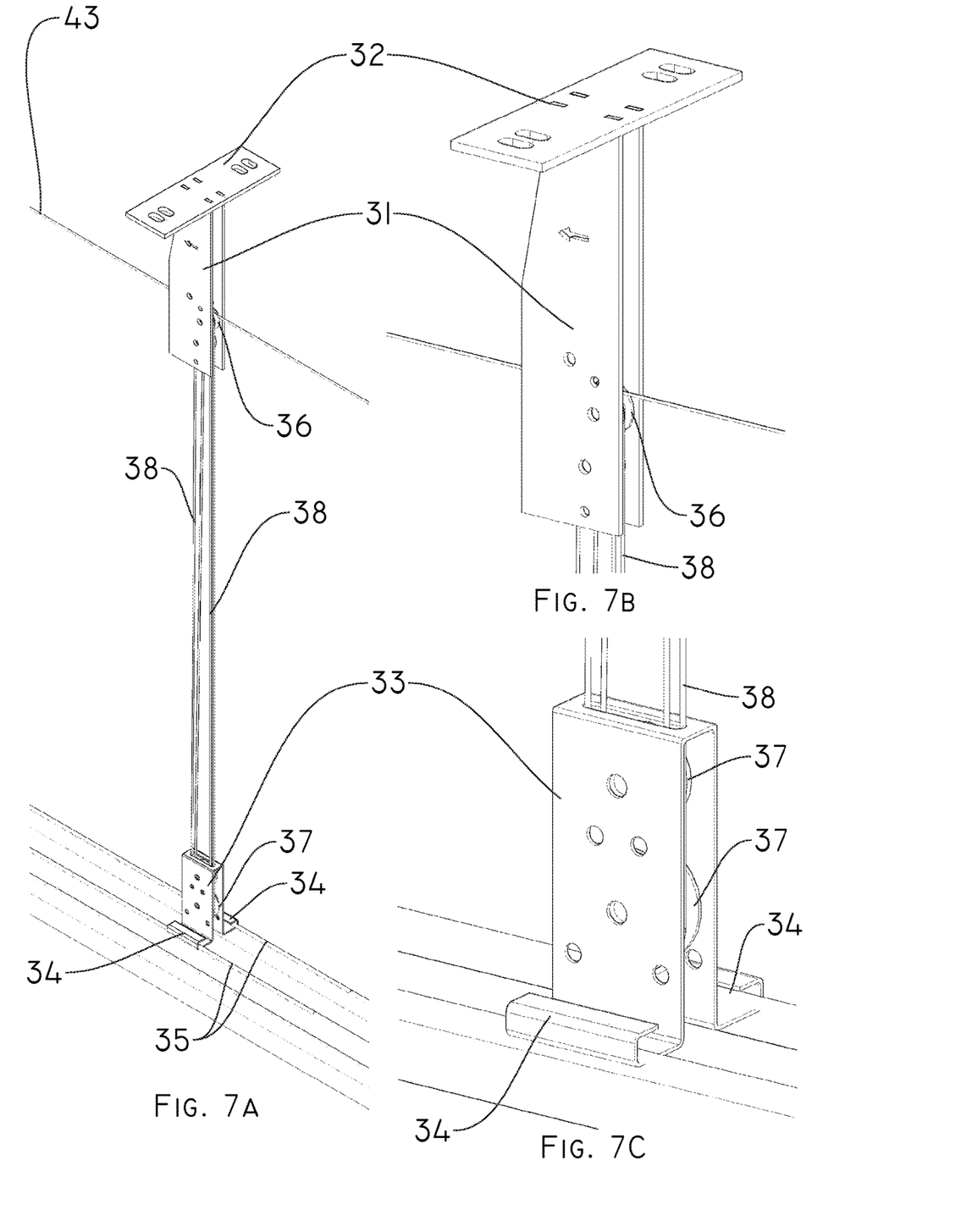
FIG. 7a shows a perspective view of a lift assembly of the main head according to the present invention.
FIGS. 7b and 7c show an enlarged perspective view of the upper and lower portion respectively of the lift assembly of the main head according to the present invention.
Figure 8:
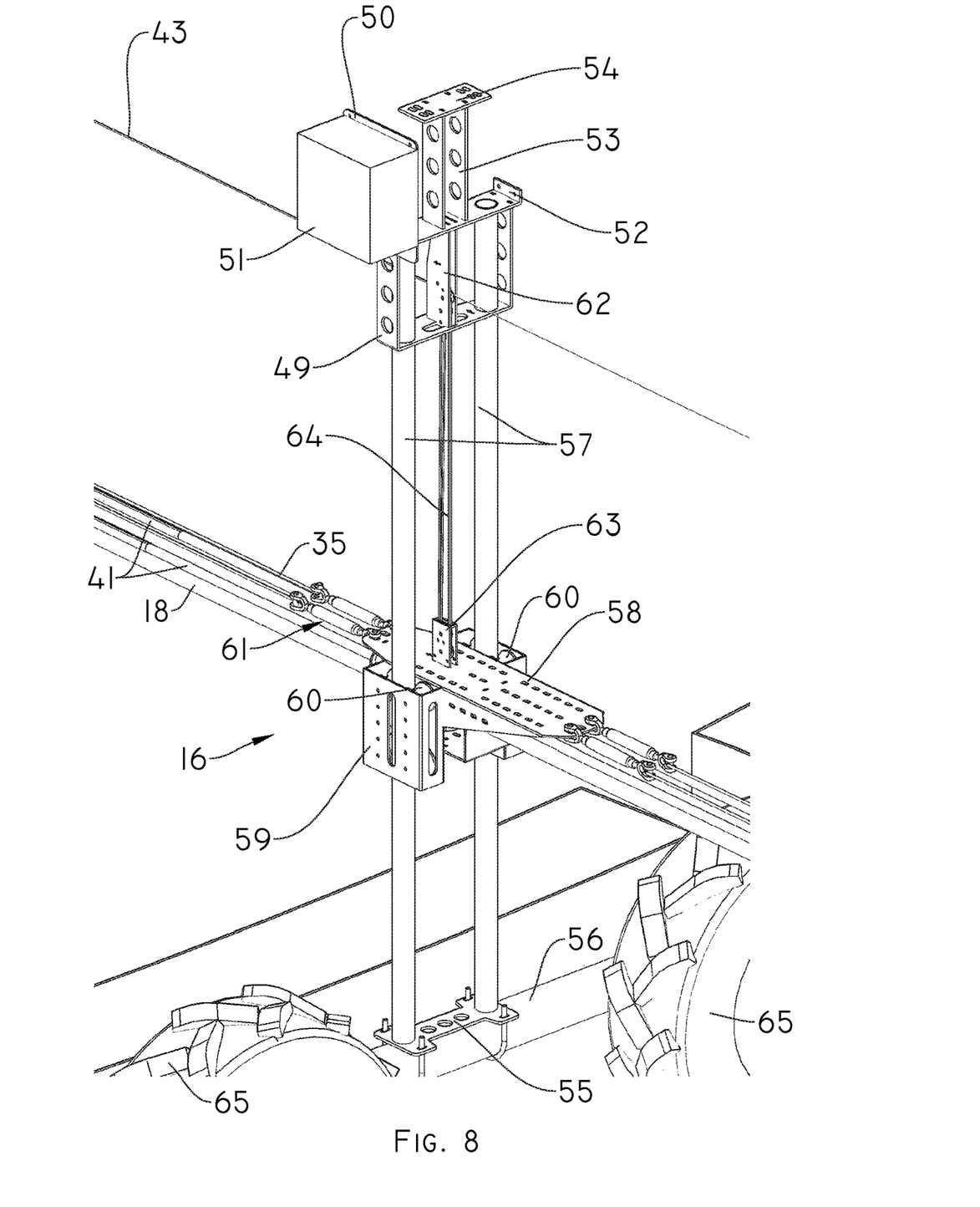
FIG. 8 shows a perspective view of a discharge head according to the present invention.
Figure 9:
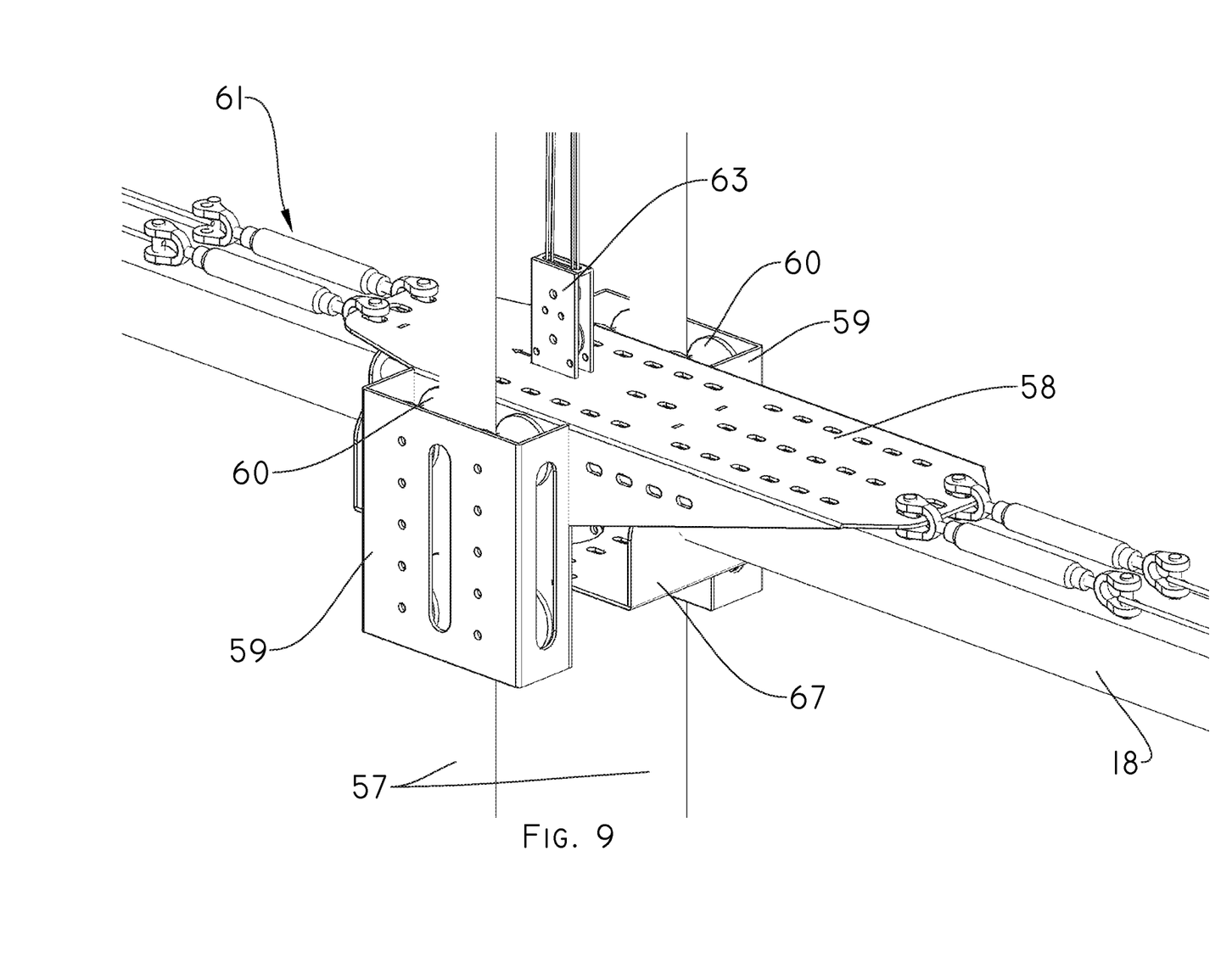
FIG. 9 shows a perspective and enlarged view of a central portion of the discharge head according to the invention.
Figure 10:
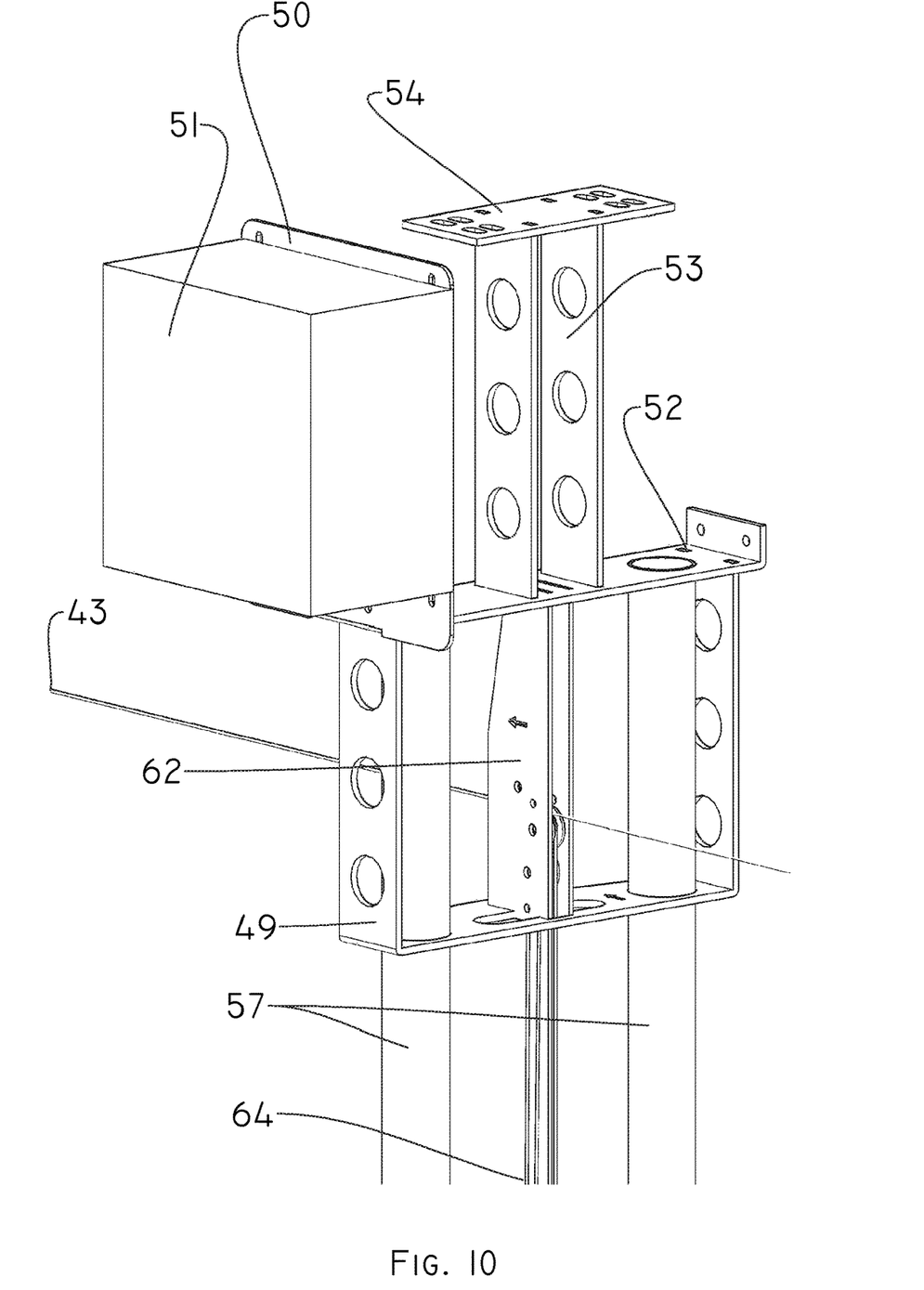
FIG. 10 shows a perspective and enlarged view of an upper portion of the discharge head according to the present invention.
Figure 11:
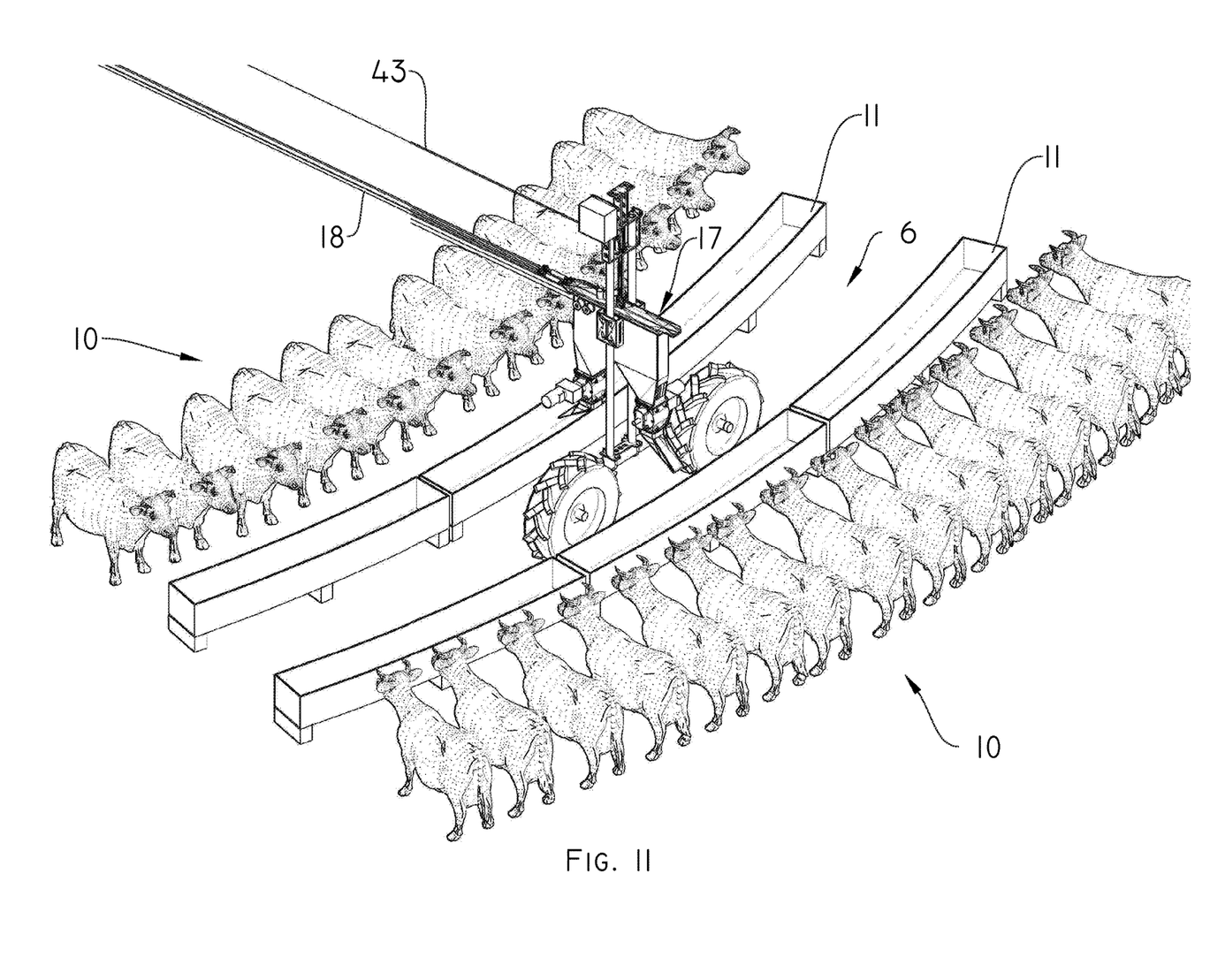
FIG. 11 shows a perspective and enlarged view of a portion of the feeding track and a displacement track through which a second discharge head circulates according to the present invention.

Wherein, said main head 13 comprises an upper plate 25 connected to a lower plate 26 through respective support columns 27, and a central plate 28 of the head arranged in a middle portion between said upper and lower plates 25 and 26, said central plate 28 having respective lateral plates 29 with guide rollers 30 through which said support columns 27 pass through, such as better illustrated in FIG. 6. Said main head 13 further comprises a lift assembly having a cable guide plate 31 mounted through an upper guide plate 32 in said upper plate 25 of the head, a lower cable guide plate 33 mounted on said central plate and having respective lateral flanges 34 through which a pair of support cables 35 pass, both cable guide plates 31 and 33 being provided with respective pulleys 36 and 37, and operatively connected to each other via secondary lift cables 38, as best illustrated in FIGS. 7a to 7c.

For its part, said control panel 24 is mounted on said lower plate 26 through a pair of panel supports 39, while said central plate 28 has a pair of supports 40 for cable carrying pipes 41 and a pair of interior supports 42 for said support cables 35 which are fixed through respective tensioners 72. The control panel 24 shall allow collection of information for supplying food to the main pipe through the blower and rotary valves. It is noted that, between said main head 13 and said main pipe 18, there is a metering valve (not shown) which is operated by the control panel 24.

Likewise, a main lifting cable 43 is provided which passes through said cable guide plate 32 extending at least along the entire length of the first span 14 and second span 15. Said main lifting cable 43 has one end fixed to a winch 44, it can be mechanical or manual, which is mounted on a portion of the first span 14 through a support plate 45 and an opposite end fixed to said second discharge head 17, passing through the first discharge head 16. In turn, a pair of cable-tensioners assemblies 46 are fixed between said support plate 45 of the first span 14 and the lower plate 26 of the main head 13 to thereby keep, in conjunction with the main lifting cable 43, said main head 13 suspended. Likewise, it can be seen that the main pipe 18 is raised thanks to the arrangement of a pair of curves 73 and suspended through a pair of vertical support tensioners 47 whose upper end is fixed to an upper structural bar 48 that extends from the pivot base 12 and along at least the first and second span. The upper structural bar 48, in turn, allows the synchronized pivoting movement of the first and second span so as to "pass through" all the feeders 11 simultaneously.

In relation to the discharge heads 16 and 17, both are structurally similar, therefore, reference and description shall be made in relation to one of the two, understanding that the other discharge head has the same characteristics. However, the only difference is that the first discharge head 16 in turn fulfills the function of intermediate head, so that its central plate, which will be described below, will support the tensioners and cables that extend towards the second support head in whose structure they end their path. If there are three or more spans with their respective discharge heads, the heads that are arranged between the main head 13 and the last discharge head, will act as intermediate heads.

Thus, and according to FIGS. 8 to 12, each of the discharge heads 16, 17 comprises a base 49 provided at least on the top with one box supporting plate 50 supporting a tower control box 51 as a whole with at least one linking plate 52, respective vertical plates 53 extending upwards to an upper plate 54 through which the discharge head 16, 17 is connected to said structural bar 48. Said discharge head 16, 17 further comprises a lower plate 55 which is connected to a drive shaft 56 of a lower running gear 65 which allows movement through the displacement tracks, at least a pair of support columns 57 interconnecting said base 49 with said lower plate 55 and at least a central plate 58 provided with a pair of lateral plates 59 with guide rollers 60 through which said support columns 57 pass in a guiding manner, furthermore, in said central plate 58 the ends of the support cables 35, coming from the main head 13, are fixed through respective tensioners 61.

Also, a lift assembly is provided which comprises an upper cable guide plate 62 arranged in said base 49 and at least one lower plate 63 mounted on said central plate 58 and having respective lateral flanges through which the support cables 35 pass, both cable guide plates 62, 63 being provided with respective pulleys and operatively connected to each other via secondary lifting cables 64.

Figure 12:
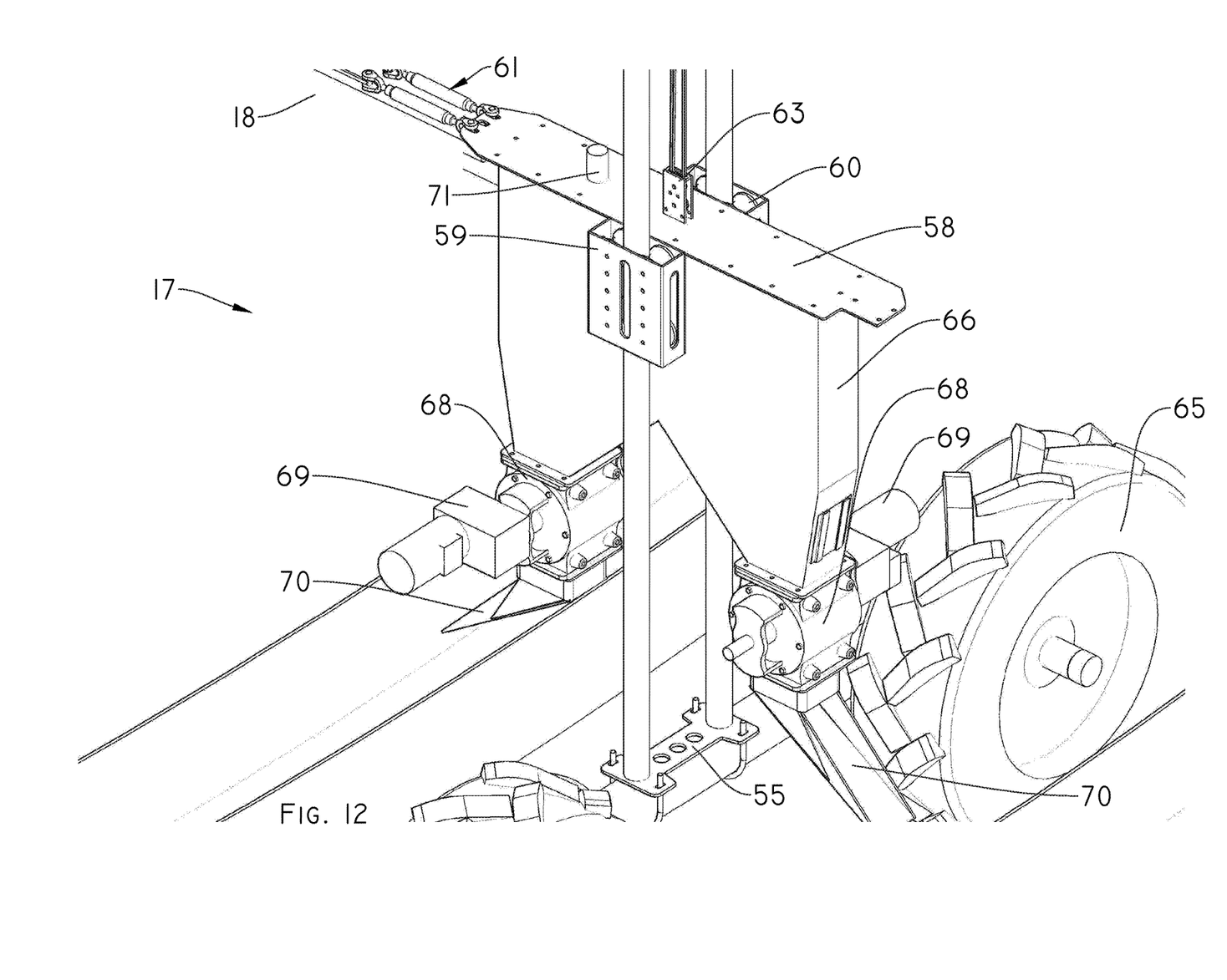
FIG. 12 shows a perspective and enlarged view of a central portion of the discharge head wherein one can observe the discharge means that allow the discharge of food in the feeders according to the present invention.
Figure 13:
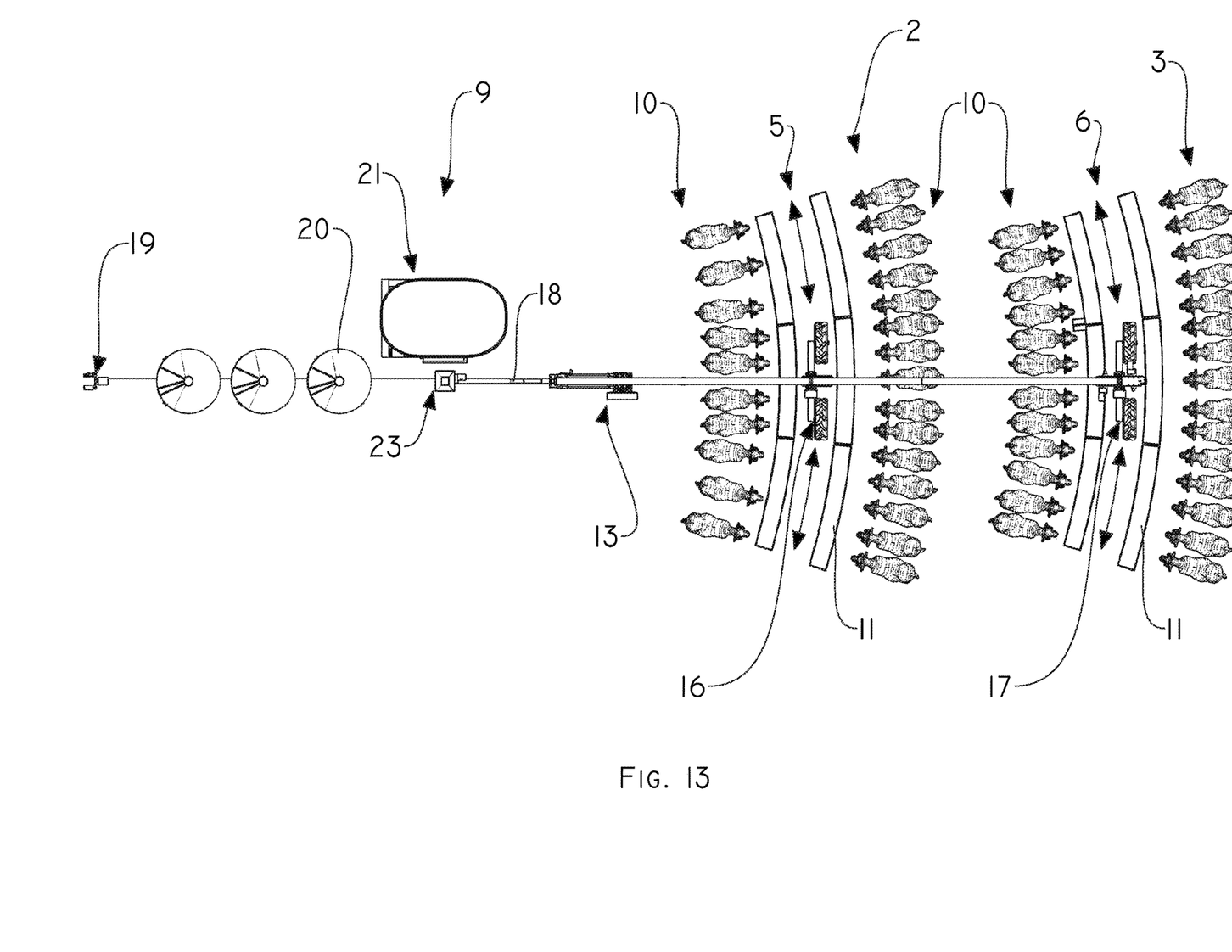
FIG. 13 shows a partial top view of the system of the invention.
Figure 14:
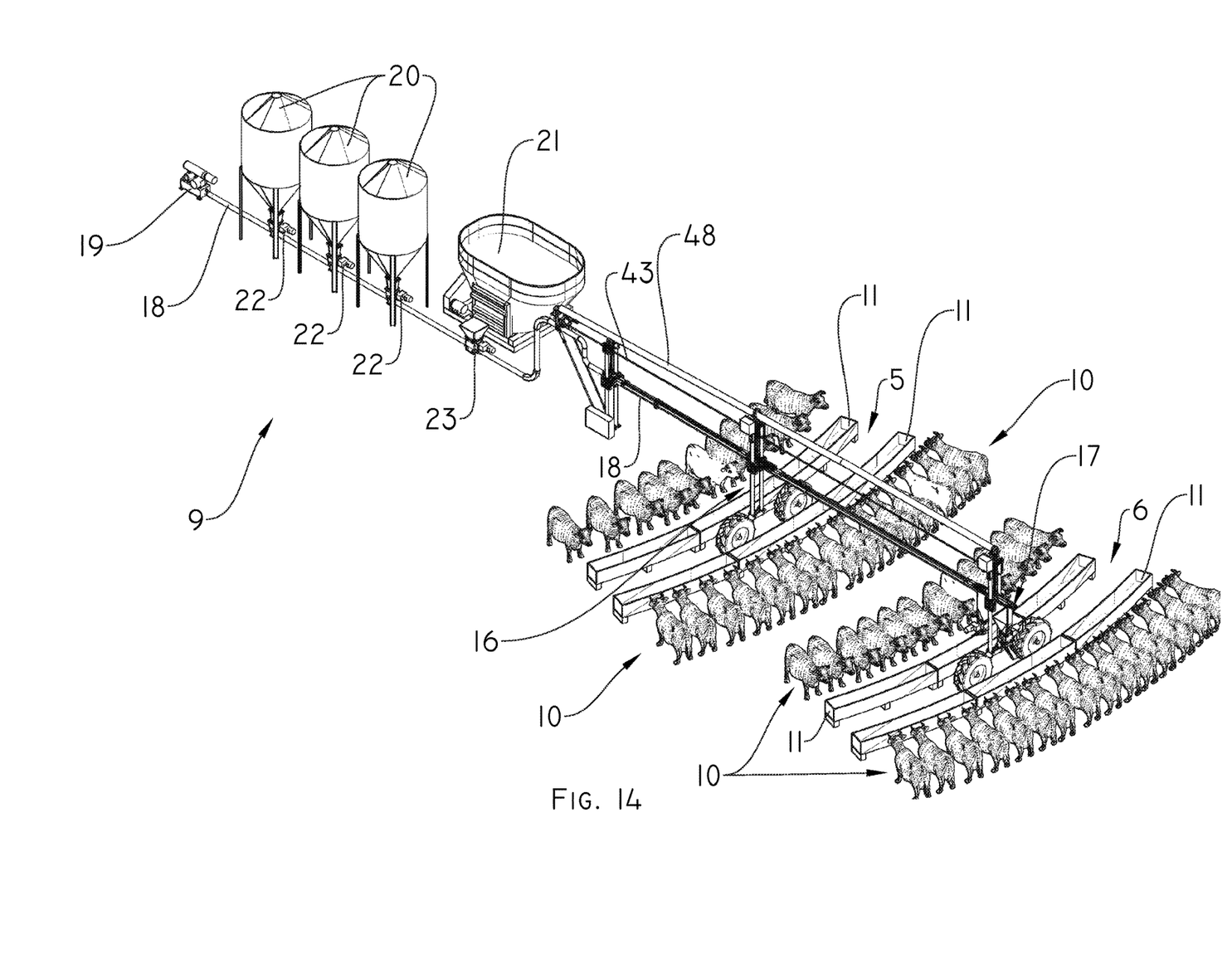
FIG. 14 shows a perspective view of the system of the present invention.

On the other hand, the discharge head 16, 17 has means for discharging food coming from the main pipe 18 towards the respective feeders 11 that surround the perimeter of the concentric circular sections. Wherein, said discharge means comprise at least one pair of feed hoppers 66 each of which receives feed from the main pipe 18, being inferiorly connected to respective rotary valves 68 driven through motor-reducers 69 which control the speed of discharge and allowing the controlled discharge of the food through a feed tray 70 that faces the feeders 11. To control the level of food inside the feeding hoppers 66, level sensors 71 are provided.

It is noted that the discharge head 16 of the first span 14 and the discharge head 17 of the second span 15 move through different displacement tracks feeding the respective feeders that surround the respective circular sections. Likewise, the invention is not limited to said number of spans and discharge heads, but there are provided as many span or sections as circulation tracks are, the span being aligned linearly, and each one of which has its ends respective end discharge heads.

All the information of the sensors available in the discharge heads is collected by each of the corresponding control boxes 51, which record the movements of the self-propelled machine, determining the position in which each distribution point is located, reading the demand of each target and determining the quantity to be distributed on the surface of the track corresponding to each segment of feeders. Therefore, the control box, when receiving the information from said sensors and with the air blower on, drives the necessary air so that the metering valve can load the product in the main line and take the product to the different distribution valves. By sending the drive signal to the motor-reducers 69, the rotational speed of the rotary valves 68 is increased or decreased depending on the amount of food to be distributed for each feeder to which a different animal goes.

Likewise, each control box 51 is in operative communication with the control panel 24 which sends the corresponding signal so that the blower blows air, thus again filling the main pipe 18 with food and consequently the supply hoppers 66. In turn, the control panel reads the sensors to determine when to carry out the distribution and to control other functions so that the system can distribute the dose/portion of products desired by the user.

Alternatively, the present invention can have a pair of sensors collecting information of targets to be fed. These sensors can be facial detection sensors that allow identifying each animal prior to the discharge of food. With this, we seek to deliver the exact amount that each individual animal needs to maintain the related diet. The facial detection sensor detects the animal, sends the signal to a database and based on the stored information thereof, a signal is sent to the control box which shall regulate the speed of the corresponding rotary valve to supply the adequate amount of food in its feeder 11.

The system of the present invention has an automated and programmed action, contained in a prescription map previously designed according to the needs of each feeding pen to automatically distribute the amount of food necessary for each feeder. With this, the distribution of food is greatly facilitated since it does not require an operator to carry out the discharge of food in the feeders.

It is emphasized that pens can be roofed to prevent the animals from getting wet, leaving enough free space between ceilings for the movement of the span through the displacement tracks.

By way of example but not limiting the invention, distribution tracks as long as perimeters formed within those 100 m can be achieved with only 100 m of machine. Animal portions can include 4 points every 15 m in the last final 45 m of the self-propelled machine being equal to $(L+L-15+L-15*2+L-15*3)*2*PI$, which amounts to a total of 1947 m of distribution tracks, this being unthinkable so far only with 100 m-system. This can be done up to nine times a day with standard speeds of commercial irrigation machines and with only four distribution points.

In another example of application, but not limiting the invention, three sections or spans having 32 meters each can be provided. The first 32 meters can feed 470 animals, the second 32 meters can feed 950 animals, while the third 32 meters' span can feed 1420 animals, resulting in the feeding of 2840 animals with only three sections of meters, which may be extensible according to the structural limitations of the place.

In this way, the system for the controlled distribution of the present invention is constituted and constructed, which allows the distribution of products and/or gathering of information of multiple tracks or surfaces that are included within the path of a self-propelled central pivot machine. The system is composed of a plurality of distribution points that are installed consecutively one behind the other covering different distribution tracks that make it possible, only with the length of the machine, to achieve a theoretically infinite multiplicity of distribution tracks only limited by the spatial requirements of the target to be fed. That is, for a length of the machine, a much greater length of discharge path in many more feeders is achieved.

A reader or sensor installed in each distribution point can read or interpret the requirement or portion of the target and modify in real time the quantity supplied at all times transforming the entire self-propelled machine into a variable, efficient, inexpensive feeding system that can divide in several daily shifts the animal portion regardless of the conditions of the surface on which it moves since it is known that these types of machines have the capacity to move on difficult lands. Thus allowing a surprisingly new use for irrigation machines, and providing a contribution to society with a relevant impact since only with its length, it can achieve a multiple distribution path equivalent to so many perimeters can conform below its length. To modify the portion distributed to each track independently to the next, the speed of rotation of the metering valve of that point can be modified, or the speed of travel of the machine or both can be modified.

That is, the present invention through the air blower 19, blows food from the silos 20 and mixer truck 21 towards the main pipe 18, which is in connection with the respective discharge heads 16, 17. Discharge heads 16, 17 and the main pipe 18, allow the passage of food to the storage hoppers 66. The rotary valves 68 connected to the hoppers 66, shall allow the controlled discharge of the necessary portion for each feeder 11 to which certain animals 10 go. The necessary amount of food portion is controlled by the control boxes 51 that collect information from the related sensors. In this way, as the self-propelled machine pivots, moving by virtue of the lower running gear of each discharge head, the controlled simultaneous discharge of food is carried out for each particular feeder.

The present invention can distribute variable doses of solid products, powders, granules, liquids, etc. without any inconvenience. For the purpose of this specification, the term "products" should be understood as any type of fluid, powder or solid or granular material, to be applied and/or distributed at different points along displacement of the structure of a self-propelled irrigation machine. The most common products are animal feed, powdered and liquid fertilizers, and the like, diluted in water, oil, pure, etc.

While particular embodiments of the present system for the controlled distribution of food for feeding animals has been described herein, it will be appreciated by those skilled in the art that changes and modifications may be made thereto without departing from the invention in its broader aspects and as set forth in the following claims.

The invention claimed is:

1. A system for the controlled distribution of food for feeding animals, the system comprising:
    a plurality of circular concentric sections and separated at a distance from each other such that respective tracks of displacement are defined between them, said sections being interrupted in a middle portion by a passage projecting towards the center,
    a self-propelled central pivot machine arranged in said center and connected to an external feeding means, said self-propelled machine having at least one pivot base and at least one main head;
    at least a first pivoting span connected to said pivot base and at which proximal end said main head is arranged while at the distal end there is a discharge head;
    at least a main pipe that transports the food coming from the external feeding means to the main head and from the latter to the discharge head;
    wherein, said discharge head comprises means for discharging food coming from the main pipe to respective feeders that surround the perimeter of the concentric circular sections, and at least one lower rolling train that allows the transfer of the discharge head through the displacement tracks.

2. The system for the controlled distribution of food of claim 1, wherein said external feeding means comprises at least an air blower connected to said main pipe, a plurality of silos and at least one stationary mixer, said silos and mixer being connected to the main pipe through respective rotary valves.

3. The system for the controlled distribution of claim 1, wherein said main head comprises an upper plate connected to a lower plate through respective support columns, and a central plate of the head arranged in a middle portion between said upper and lower plates, wherein said central plate has respective lateral plates with guide rollers through which said support columns pass in a guided manner.

4. The system for the controlled distribution of claim 3, wherein said main head further comprises a lift assembly having a cable guide plate mounted through an upper guide plate on said upper plate of the head, a lower cable guide plate mounted on said central plate and having respective lateral flanges through which a pair of support cables pass through, both cable guide plates being provided with respective pulleys and operatively connected to each other through secondary lifting cables.

5. The system for the controlled distribution of claim 4, wherein said main head further has a control panel mounted on said lower plate through a pair of panel supports, while said central plate has a pair of supports for cable-carrying pipes and a pair of internal supports for said support cables which are fixed through respective tensioners.

6. The system for the controlled distribution of claim 5, wherein said self-propelled central pivot machine is provided with a main lifting cable which passes guidingly through said cable guide plate extending for at least the entire length of the first span, and having a end fixed to a winch which is mounted on a portion of the first span through a support plate and an opposite end fixed to said discharge head, in turn, there being a pair of fixed tensioners between said support plate of the first span and the lower plate of the main head to maintain, as a whole with the main lifting cable, said main suspended head.

7. The system for the controlled distribution of claim 1, wherein said discharge head comprises a base provided at the top with at least one box support plate supporting a tower control box, at least one linking plate, each vertical plate extending up to an upper plate through which the discharge head is located connected to a top structural bar extending from the pivot base and along at least the first span.

8. The system for the controlled distribution of claim 5, wherein said discharge head further comprises a lower plate that is connected to a drive shaft of the lower running gear, at least a pair of support columns interconnecting said base with said lower plate and at least one central plate provided with a pair of side plates with guide rollers through which said support columns pass guidingly, being in addition that, in said central plate the ends of the support cables are fixed, coming from the main head, through respective tensioners.

9. The system for the controlled distribution of claim 8, further comprising a lift assembly that comprises an upper cable guide plate arranged in said base and at least one lower plate mounted on said central plate and having respective lateral flanges through which support cables pass, both cable guide plates being provided with respective pulleys and operatively connected to each other through secondary lifting cables.

10. The system for the controlled distribution of claim 9, wherein said means for discharging food comprise at least pair of feeding hoppers each of which receives the food from the main pipe, being connected to the respective rotary valves operated through motor-reducers, allowing the controlled discharge of food through a feeding tray that faces the feeders.

11. The system for the controlled distribution of claim 10, wherein said feeding hoppers have level sensors.

12. The system for the controlled distribution of claim 1, further comprising at least one second span connected and aligned linearly with the first span, said second span having a final end provided with a second discharge head, which is connected to said main pipe.

13. The system for the controlled distribution of claim 12, wherein the discharge head of the first span and the discharge head of the second span, circulate through different displacement tracks feeding the respective feeders that surround the respective circular sections.

14. The system for the controlled distribution of claim 13, wherein it is provided with as many spans as displacement tracks are, the span being aligned linearly, and each of which having discharge heads at their respective ends.

15. The system for the controlled distribution of claim 1, further comprising sensors for collecting information of the animals to be fed.

\* \* \* \* \*